(12) United States Patent
Chen

(10) Patent No.: US 9,728,953 B2
(45) Date of Patent: Aug. 8, 2017

(54) FAULT DETECTION CIRCUIT AND FAULT DETECTION METHOD

(71) Applicant: ADVANCED OPTOELECTRONIC TECHNOLOGY, INC., Hsinchu Hsien (TW)

(72) Inventor: Yuan-Ching Chen, Hsinchu (TW)

(73) Assignee: ADVANCED OPTOELECTRONIC TECHNOLOGY, INC., Hsinchu (TW)

( * ) Notice: Subject to any disclaimer, the term of this patent is extended or adjusted under 35 U.S.C. 154(b) by 330 days.

(21) Appl. No.: 14/620,473

(22) Filed: Feb. 12, 2015

(65) Prior Publication Data

US 2015/0244161 A1    Aug. 27, 2015

(30) Foreign Application Priority Data

Feb. 25, 2014  (CN) .......................... 2014 1 0063632

(51) Int. Cl.
| | |
|---|---|
| *H02H 1/04* | (2006.01) |
| *H02H 3/05* | (2006.01) |
| *H02H 3/50* | (2006.01) |
| *H02H 3/04* | (2006.01) |

(52) U.S. Cl.
CPC ................. *H02H 3/50* (2013.01); *H02H 3/04* (2013.01)

(58) Field of Classification Search
CPC ............. H02H 1/04; H02H 3/05; H02H 3/044
USPC ........................................................ 361/78
See application file for complete search history.

(56) References Cited

U.S. PATENT DOCUMENTS

| 9,516,711 B2* | 12/2016 | Weil ................... H05B 33/0818 |
| 2007/0159750 A1* | 7/2007 | Peker ................. H05B 33/0869 |
| | | 361/93.1 |
| 2011/0254462 A1* | 10/2011 | Ruan .................. H05B 33/0815 |
| | | 315/291 |
| 2013/0114167 A1* | 5/2013 | Lin ....................... H05B 33/089 |
| | | 361/42 |

(Continued)

FOREIGN PATENT DOCUMENTS

CN        202310229 U      7/2012

OTHER PUBLICATIONS

"AN1327 /D: Very Wide Input Voltage Range, Off-Line Flyback Switching Power Supply" Semiconductor Components Industries, LLC, Dec. 2012.

(Continued)

*Primary Examiner* — Dharti Patel
(74) *Attorney, Agent, or Firm* — Steven Reiss

(57) ABSTRACT

A fault detection circuit includes a micro processing unit configured to output a first pulse width modulation (PWM) signal, a driver electrically coupled to the micro processing unit, and a comparator configured to electrically connect the micro processing unit and the driver. The first PWM signal is configured to drive the driver to output a second PWM signal configured to drive the electrical device. The comparator is configured to compare the second PWM signal with a reference level to output a third PWM signal to the micro processing unit. The third PWM signal contains a number of high level signals and low level signals. The micro processing unit is configured to detect the number of the high level signals and the number of the low level signals during at least one time period to determine a status of an electrical device.

10 Claims, 5 Drawing Sheets

(56) References Cited

U.S. PATENT DOCUMENTS

2013/0334968 A1* 12/2013 Nakano ................ H05B 33/083
                                                                    315/122
2014/0354159 A1* 12/2014 Zhang ................ H05B 33/0815
                                                                    315/127
2015/0022168 A1*  1/2015 Mednik ................ H02M 3/155
                                                                    323/282

OTHER PUBLICATIONS

"UC3842/3/4/5 Provides Low-Cost Current-Mode Control", Texas Instruments Incorporated, 1999.

* cited by examiner

FAULT DETECTION CIRCUIT AND FAULT DETECTION METHOD

FIELD

The subject matter herein generally relates to a fault detection circuit for an electrical device driven by PWM signals and a method for detecting a fault of the electrical device.

BACKGROUND

A typical electrical device is driven by constant current and a fault of this kind of electrical device can be detected by an ammeter or a voltmeter. However, the ammeter or the voltmeter is not appropriate for a fault of a kind of electrical device driven by Pulse-Width Modulation (PWM) signals which is comprised of high level signals and low level signals alternatively changing with each other.

BRIEF DESCRIPTION OF THE DRAWINGS

Implementations of the present technology will now be described, by way of example only, with reference to the attached figures.

DETAILED DESCRIPTION

Figure 1:
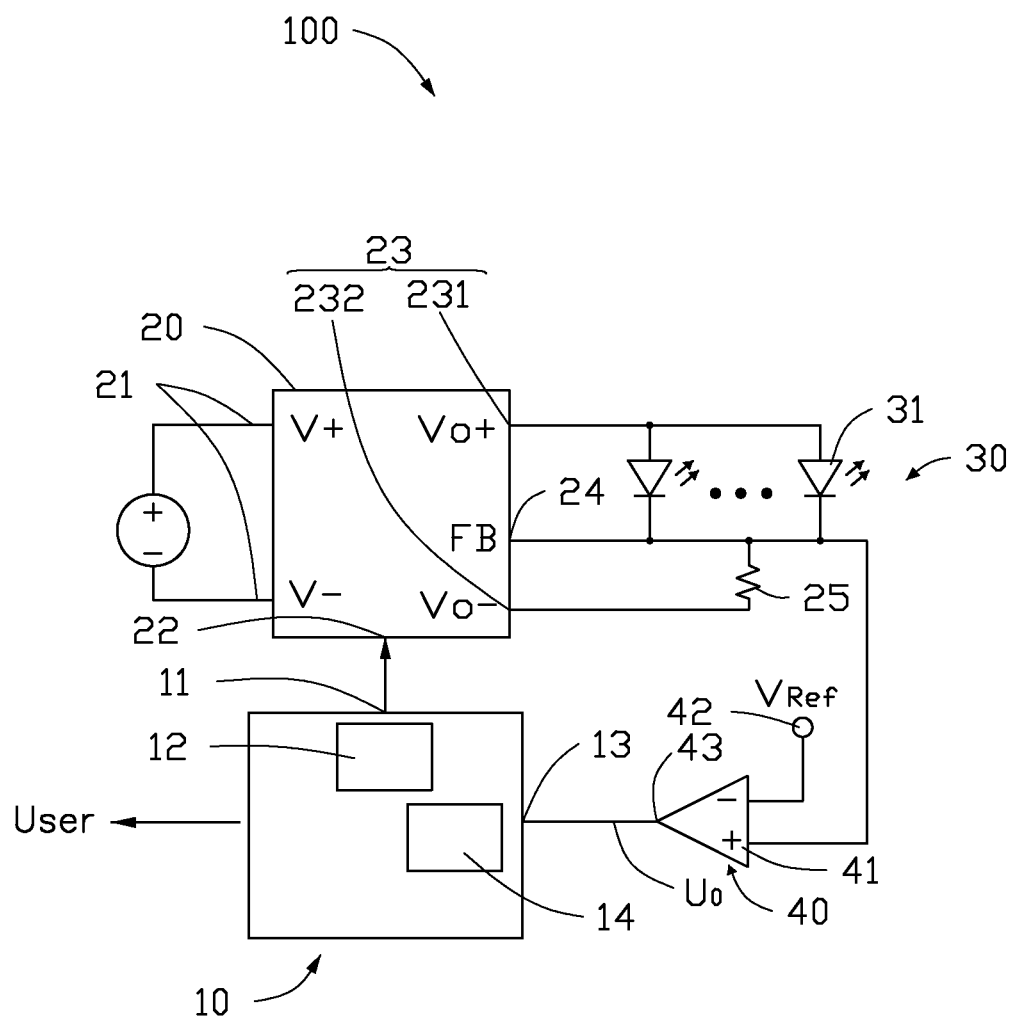
FIG. 1 is a diagrammatic view of a fault detection circuit in accordance with a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a fault detection circuit 100 of a first embodiment. The fault detection circuit 100 includes a micro processing unit 10, a driver 20 electrically coupling with the micro processing unit 10, an electrical device 30, and a comparator 40 electrically coupling between the micro processing unit 10 and the driver 20.

The micro processing unit 10 has an output port 11, an input port 13, a PWM module 12 and a testing module 14. The micro processing unit 10 can be a micro controller unit.

The PWM module 12 outputs a first PWM signal via the output port 11 to the driver 20 to drive the electrical device 30 to output a second PWM signals. The second PWM signals drive the electrical device 30 to work.

Referring to FIG. 1, the first PWM signal has a high level output voltage U and a period T. The first PWM signal is a square wave signal. The duty cycle of the first PWM signal can be variable according to the parameters of the electrical device 30. The duty cycle of the first PWM signal can be 0, 1 and between 0 and 1.

The driver 20 has a power port 21, an input port 22 and an output port 23. The driver 20 can be a flip-flop. The power port 21 of the driver 20 can be electrically connected to a power source 200, which is used to supply power to the driver 20. The input port 22 of the driver 20 electrically connects the output port 11 of the micro processing unit 10. The driver 20 receives the first PWM signal from the micro processing unit 10. The output port 23 outputs a second PWM signal. In this embodiment, when the micro processing unit 10 outputs a high level signal, the driver 20 outputs a high level signal; and when the micro processing unit 10 outputs a low level signal, the driver 20 outputs a low level signal.

The output port 23 has a first output port 231 and a second output 232. In this embodiment, the first output 23 is a positive port, and the second output 232 is a negative port. When the micro processing unit 10 outputs a high level signal; the first output port 231 outputs a high level signal to drive the electrical device 30 to work; and when the micro processing unit 10 outputs a low level signal, the first output port 231 outputs a low level signal, and the electrical device 30 is not working.

The driver 20 further has a feedback port 24 and a feedback resistor 25. The feedback port 24 is located between the first output port 231 and the second output port 232. In this embodiment, the electrical device 30 is connected between the first output port 231 and the feedback port 24. The feedback resistor 25 is connected between the feedback port 24 and the second output port 232. When the micro processing unit 10 outputs a high level signal, the feedback port 24 outputs a high level signal, and when the micro processing unit 10 outputs a low level signal, the feedback port outputs a low level signal.

An end of the electrical device 30 is electrically connected to the first output port 231, and an opposite end of the electrical device 30 is electrically connected to the feedback port 24. An end of the feedback resistor 25 is electrically connected to the feedback port 24, and an opposite end of the feedback resistor 25 is electrically connected to the second output port 232. In this embodiment, the electrical device 30 can have a light emitting diode 31. Alternatively, the electrical device 30 can also have a plurality of light emitting diodes 31.

The comparator 40 has a non-inverting input port 41, a reference port 42 and an output port 43. The non-inverting input port 41 is electrically connected to the feedback port 24 of the driver 20. The comparator 40 compares the output level from the feedback port 24 with the output level from the reference port 42, and then outputs a third PWM signal. And the comparator 40 outputs the third PWM signal via the output port 43 to the micro processing unit 10. In this embodiment, the third PWM signal is back to the testing module 14 of the micro processing unit 10. The testing module 14 can be a counter which can counter the number of high level signal and the number of low level signal in any period of a PWM signal.

When the output level of the feedback port 24 is higher than reference level Vref of the reference port 42 of the comparator 40, the comparator 40 outputs a high level signal; and when the output level of the feedback port 42 is lower than reference level Vref of the reference port 42 of the comparator 40, the comparator 40 outputs low level signal. As indicated above, when the first output port 231 outputs a high level signal, the feedback port 24 outputs a high level signal and is higher than reference level Vref, and the comparator 40 outputs a high level signal. When the first output port 231 outputs a low level signal, the feedback port 24 outputs a low level signal and is lower than the reference level Vref of reference port 42, and the comparator 40 outputs a low level signal.

The testing module 14 can tests or counters the number of the high level signal and the number of the low level signal of the third PWM level in a period T, and outputs the numbers to users to do some actions.

For example, when the duty cycle of the first PWM signal is 0, the micro processing unit 10 only outputs low level signals in any period T, the driver 20 correspondingly outputs low level signals within the time, the feedback port 24 also outputs low level signals which is lower than the reference level Vref of the reference port 42, and the comparator 40 also outputs low signals. So, the testing module 14 can only get a plurality of low level signals in any period T, or the electrical device 30 is in a fault status.

When the duty cycle of the first PWM signal is 1, the micro processing unit 10 only outputs high level signals in any period T, the driver 20 outputs high level signals, the feedback port 24 outputs high level signals which is higher than the reference level Vref of the reference port 42, and the comparator 40 also only outputs high level signals. So, the testing module 14 can only get a plurality of high level signals in any period T, or the electrical device 30 is in a fault status.

And when the duty cycle of the first PWM signal is between 0 and 1, such as 0.5, the micro processing unit 10 only outputs one high level signal and one low level signal in a period T, and correspondingly, the feedback port 24 also outputs one high level signal and one low level signal in a period, and the comparator 40 outputs only one high level signal and only one low level signal in a period. So, the testing module 14 can only get one high level signal and one low level signal in a period, or the electrical device 30 is in a fault status.

Figure 3:
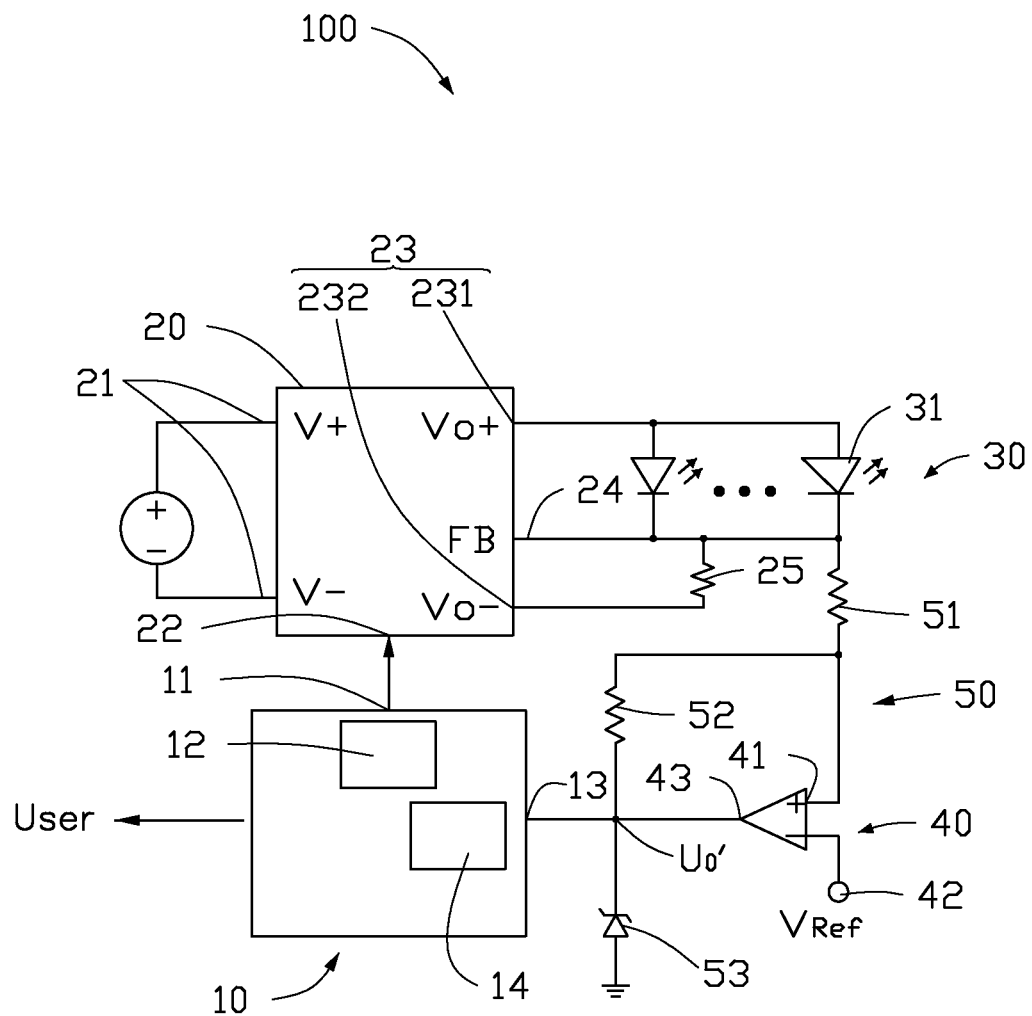
FIG. 3 is a diagrammatic view of a fault detection circuit in accordance with a second embodiment of the present disclosure.

FIG. 3 illustrates another fault detection circuit 100. In this embodiment, the comparator 40 further has an anti-interference circuit 50. The anti-interference circuit 50 has a first resistor 51, a second resistor 52 and a Zener diode 53.

The first resistor 51 is electrically connected between the feedback port 24 of the driver 20 and the non-inverting port 41 of the comparator 40. An end of the second resistor 52 connects the non-inverting port 41, and an opposite end of the second resistor 52 connects the output port 43 of the comparator 40. An anode of the Zener diode 53 is electrically connected to a ground, and a cathode of the Zener diode 53 is electrically connected to the output port 43 of the comparator 40.

Figure 2:
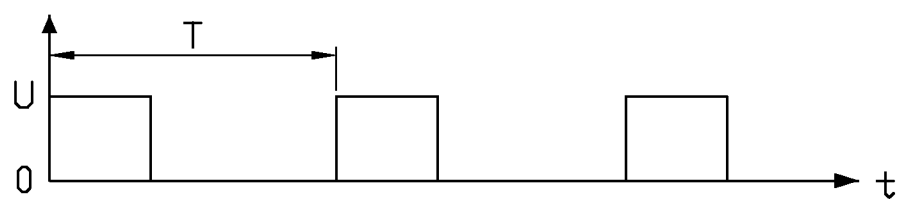
FIG. 2 is a diagrammatic view of a first PWM signal output by a micro processing unit of FIG. 1.
Figure 4:
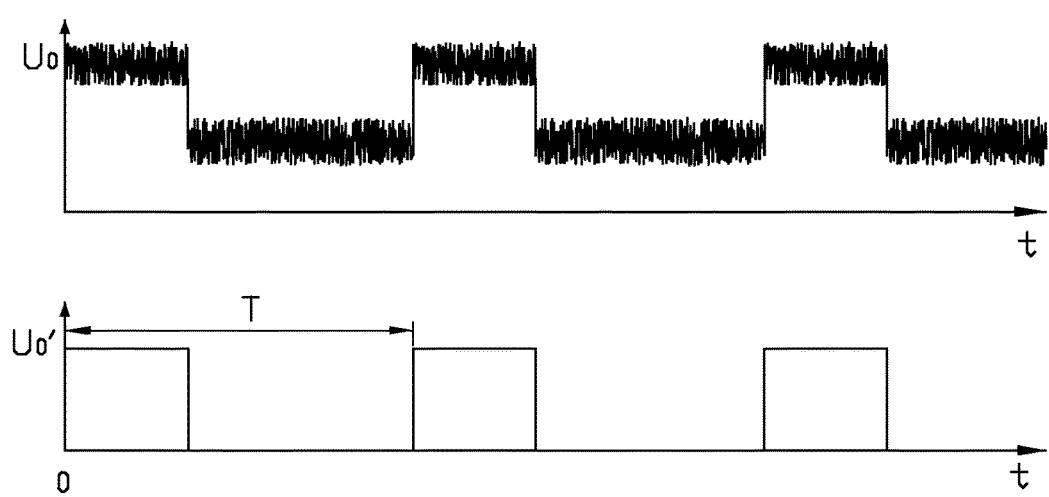
FIG. 4 is a diagrammatic view of a third PWM signal output from a comparator of FIG. 1 and a third PWM signal output from a comparator of FIG. 2.

Referring to FIG. 4 illustrates a third PWM signal U0 from an output port 43 of the comparator 40 of FIG. 1 and a third PWM signals U0' from an output port 43 of the comparator 40 of FIG. 2. According to FIG. 4, the anti-interference module 50 feedbacks a part of the third PWM signals to the non-inverting port 41 of the comparator 40 to get a more stabilized signal. And the Zener diode 53 further increases the stabilization of the output signals from the output port 43 of the comparator 40, which increases the testing accuracy of the fault detection.

Figure 5:
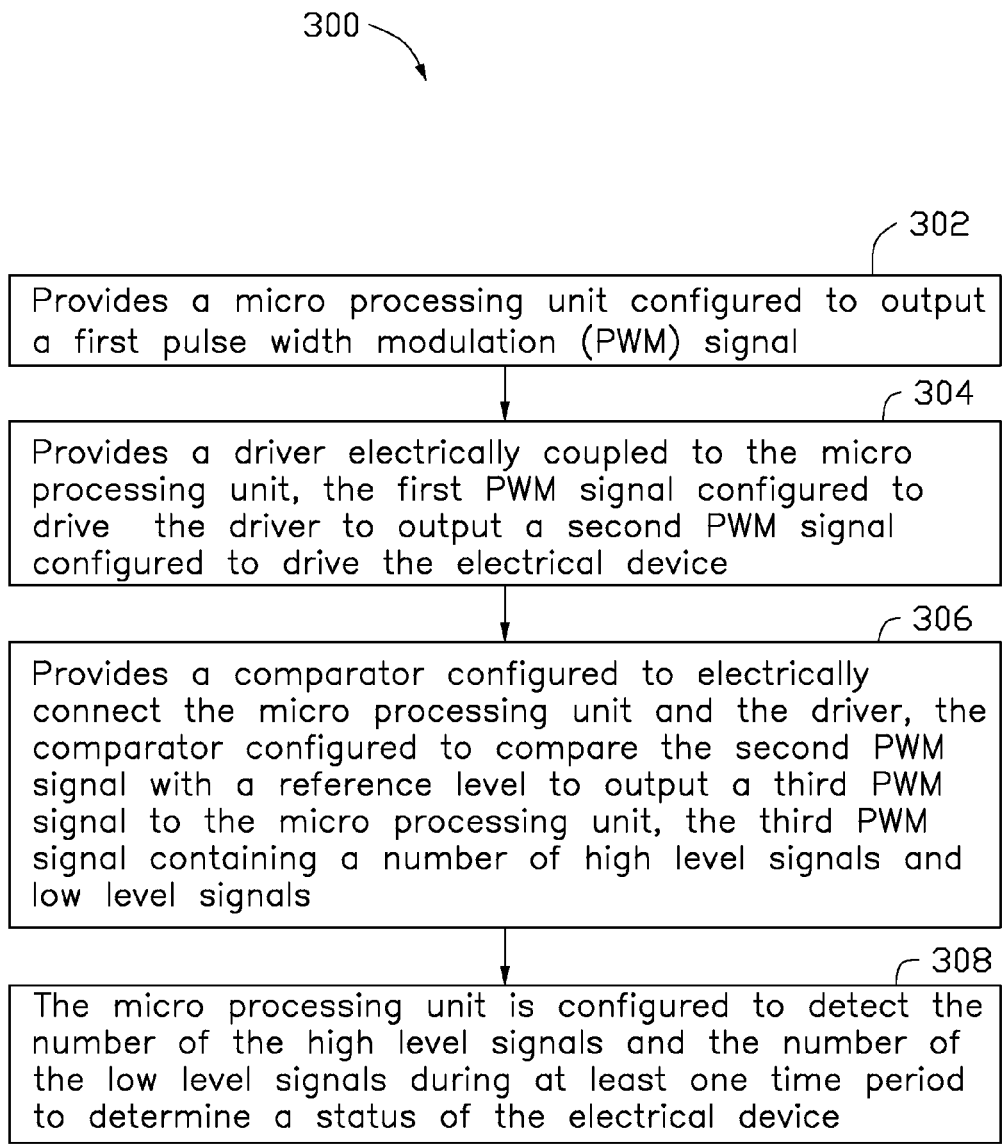
FIG. 5 is a flow chart of a method for detecting a fault of an electrical device.

Referring to FIG. 5, a flowchart is presented in accordance with an example embodiment which is being thus illustrated. The example method 300 is provided by way of example, as there are a variety of ways to carry out the method. The method 300 described below can be carried out using the configurations illustrated in FIGS. 1 and 3, for example, and various elements of these figures are referenced in explaining example method 300. Each block shown in FIG. 3 represents one or more processes, methods or subroutines, carried out in the exemplary method 300. Furthermore, the illustrated order of blocks is by example only and the order of the blocks can change according to the present disclosure. Additional blocks may be added or fewer blocks may be utilized, without departing from this disclosure. The exemplary method 300 can begin at block 302.

At block 302, provides a micro processing unit 10 configured to output a first pulse width modulation (PWM) signal.

At block 304, provides a driver 20 electrically coupled to the micro processing unit 10, the first PWM signal configured to drive the driver 20 to output a second PWM signal configured to drive the electrical device.

At block 306, provide a comparator 40 configured to electrically connect the micro processing unit 10 and the driver 20, the comparator 40 configured to compare the second PWM signal with a reference level to output a third PWM signal to the micro processing unit 10, the third PWM signal containing a number of high level signals and low level signals.

At block 308, the micro processing unit 10 is configured to detect the number of the high level signals and the number of the low level signals during at least one time period to determine a status of the electrical device.

The embodiments shown and described above are only examples. Many details are often found in the art such as the other features of a fault detection circuit and fault detection method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning the terms used in the claims. It will therefore be appreciated that the embodiments described above may be modified within the scope of the claims.

What is claimed is:

1. A fault detection circuit configured to detect a fault of an electrical device, comprising:
 a micro processing unit configured to output a first pulse width modulation (PWM) signal;

a driver electrically coupled to the micro processing unit, the first PWM signal configured to drive the driver to output a second PWM signal configured to drive the electrical device; and a comparator configured to electrically connect the micro processing unit and the driver, the comparator configured to compare the second PWM signal with a reference level to output a third PWM signal to the micro processing unit, the third PWM signal containing a number of high level signals and low level signals, the micro processing unit configured to detect the number of the high level signals and the number of the low level signals during at least one time period to determine a status of the electrical device.

2. The fault detection circuit of claim 1, wherein the first PWM signal has a variable duty cycle.

3. The fault detection circuit of claim 1, wherein the driver has an input port, a first output port, a second output port and a feedback port located between the first output port and the second output port, the electrical device electrically connects the first output port and the feedback port, and a feedback resistor electrically connects the feedback port and the second output port, and the feedback port electrically connects to the comparator.

4. The fault detection circuit of claim 3, wherein the comparator has a non-inverting input port, a reference port and an output port, the non-inverting input port electrically connects the feedback port, and the output port of the comparator electrically connects the micro processing unit.

5. The fault detection circuit of claim 4, wherein a first resistor electrically connects the feedback port of the driver and the non-inverting port of the comparator, a second resistor electrically connects the output port of the comparator and the non-inverting port of the comparator.

6. The fault detection circuit of claim 5, wherein a zener diode electrically connects the output port of the comparator and a ground.

7. The fault detection circuit of claim 1, wherein the micro processing unit has a PWM module and a test module, the PWM module outputs the first PWM signals and the test module counters the number of the high level signals and the number of the low level signals of the third PWM signals.

8. The fault detection circuit of claim 1, wherein the electrical device can be a light emitting diode.

9. The fault detection circuit of claim 1, wherein the driver can be a flip-flop.

10. A method for detecting a fault of an electrical device, comprising:

provides a micro processing unit configured to output a first pulse width modulation (PWM) signal;

provides a driver electrically coupled to the micro processing unit, the first PWM signal configured to drive the driver to output a second PWM signal configured to drive the electrical device;

provides a comparator configured to electrically connect the micro processing unit and the driver, the comparator configured to compare the second PWM signal with a reference level to output a third PWM signal to the micro processing unit, the third PWM signal containing a number of high level signals and low level signals; and wherein the micro processing unit is configured to detect the number of the high level signals and the number of the low level signals during at least one time period to determine a status of the electrical device.

* * * * *